US012737123B2

(12) United States Patent
Lu

(10) Patent No.: US 12,737,123 B2
(45) Date of Patent: Sep. 15, 2026

(54) APPARATUSES AND METHODS FOR AGGRESSOR QUEUE BASED MITIGATION THRESHOLD

(71) Applicant: Micron Technology, Inc., Boise, ID (US)

(72) Inventor: Yang Lu, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/741,485

(22) Filed: Jun. 12, 2024

(65) Prior Publication Data

US 2024/0427497 A1 Dec. 26, 2024

Related U.S. Application Data

(60) Provisional application No. 63/509,571, filed on Jun. 22, 2023.

(51) Int. Cl.
*G06F 3/06* (2006.01)

(52) U.S. Cl.
CPC .......... *G06F 3/0617* (2013.01); *G06F 3/0659* (2013.01); *G06F 3/0673* (2013.01)

(58) Field of Classification Search
CPC ............................ G11C 11/406; G11C 11/408
See application file for complete search history.

(56) References Cited

U.S. PATENT DOCUMENTS 3,633,175 A 1/1972 Harper
4,679,173 A 7/1987 Sato
5,089,957 A 2/1992 Stultz et al.
5,291,198 A 3/1994 Dingwall et al.
5,299,159 A 3/1994 Balistreri et al.
5,422,850 A 6/1995 Sukegawa et al.
5,617,348 A 4/1997 Maguire
5,638,317 A 6/1997 Tran
5,699,297 A 12/1997 Yamazaki et al.
5,751,655 A 5/1998 Yamazaki et al.
5,768,196 A 6/1998 Bloker et al.
5,874,907 A 2/1999 Craft
(Continued)

FOREIGN PATENT DOCUMENTS

CN 1144434 A 3/1997
CN 1195173 A 10/1998
(Continued)

OTHER PUBLICATIONS

US 11,264,075 B2, 03/2022, Bell et al. (withdrawn)
(Continued)

*Primary Examiner* — Amir Zarabian
*Assistant Examiner* — Anthony Thinh Tang
(74) *Attorney, Agent, or Firm* — Dorsey & Whitney LLP

(57) ABSTRACT

Apparatuses and methods aggressor queue mitigation based threshold. A memory device detects aggressor rows by changing a count value associated with the row when it is accessed and comparing the count value to a mitigation threshold. Identified aggressor rows are stored in an aggressor queue. The value of the mitigation threshold is set based on a number of addresses which are stored in the aggressor queue. For example the threshold may increase as the number of addresses in the queue increases.

20 Claims, 5 Drawing Sheets

(56) References Cited

U.S. PATENT DOCUMENTS 5,933,377 A 8/1999 Hidaka
5,943,283 A 8/1999 Wong et al.
5,970,507 A 10/1999 Kato et al.
5,999,471 A 12/1999 Choi
6,002,629 A 12/1999 Kim et al.
6,011,734 A 1/2000 Pappert
6,061,290 A 5/2000 Shirley
6,212,118 B1 4/2001 Fujita
6,310,806 B1 10/2001 Higashi et al.
6,317,381 B1 11/2001 Gans et al.
6,338,154 B2 1/2002 Kim
6,373,738 B1 4/2002 Towler et al.
6,392,952 B1 5/2002 Chen et al.
6,424,582 B1 7/2002 Ooishi
6,434,064 B2 8/2002 Nagai
6,452,868 B1 9/2002 Fister
6,480,931 B1 11/2002 Buti et al.
6,515,928 B2 2/2003 Sato et al.
6,567,340 B1 5/2003 Nataraj et al.
6,950,364 B2 9/2005 Kim
7,027,343 B2 4/2006 Sinha et al.
7,057,960 B1 6/2006 Fiscus et al.
7,082,070 B2 7/2006 Hong
7,187,607 B2 3/2007 Koshikawa et al.
7,203,113 B2 4/2007 Takahashi et al.
7,203,115 B2 4/2007 Eto et al.
7,209,402 B2 4/2007 Shinozaki et al.
7,215,588 B2 5/2007 Lee
7,283,380 B1 10/2007 Srinivasan et al.
7,304,875 B1 12/2007 Lien et al.
7,319,602 B1 1/2008 Srinivasan et al.
7,444,577 B2 10/2008 Best et al.
7,551,502 B2 6/2009 Dono et al.
7,565,479 B2 7/2009 Best et al.
7,830,742 B2 11/2010 Han
7,870,362 B2 1/2011 Hong et al.
7,872,907 B2 1/2011 Okayama et al.
8,174,921 B2 5/2012 Kim et al.
8,400,805 B2 3/2013 Yoko
8,451,677 B2 5/2013 Okahiro et al.
8,625,360 B2 1/2014 Iwamoto et al.
8,676,725 B1 3/2014 Lin et al.
8,681,578 B2 3/2014 Narui
8,756,368 B2 6/2014 Best et al.
8,811,100 B2 8/2014 Ku
8,862,973 B2 10/2014 Zimmerman et al.
8,938,573 B2 1/2015 Greenfield et al.
9,032,141 B2 5/2015 Bains et al.
9,047,978 B2 6/2015 Bell et al.
9,058,900 B2 6/2015 Kang
9,087,554 B1 7/2015 Park
9,087,602 B2 7/2015 Youn et al.
9,117,544 B2 8/2015 Bains et al.
9,123,447 B2 9/2015 Lee et al.
9,153,294 B2 10/2015 Kang
9,190,137 B2 11/2015 Kim et al.
9,190,139 B2 11/2015 Jung et al.
9,251,885 B2 2/2016 Greenfield et al.
9,286,964 B2 3/2016 Halbert et al.
9,299,457 B2 3/2016 Chun et al.
9,311,985 B2 4/2016 Lee et al.
9,324,398 B2 4/2016 Jones et al.
9,384,821 B2 7/2016 Bains et al.
9,390,782 B2 7/2016 Best et al.
9,412,432 B2 8/2016 Narul et al.
9,418,741 B1 8/2016 Ramaraju et al.
9,424,907 B2 8/2016 Fujishiro
9,449,675 B2 9/2016 Wheeler
9,484,079 B2 11/2016 Lee
9,514,850 B2 12/2016 Kim
9,570,143 B2 2/2017 Lim et al.
9,646,672 B1 5/2017 Kim et al.
9,672,889 B2 6/2017 Lee et al.
9,685,240 B1 6/2017 Park
9,691,466 B1 6/2017 Kim
9,697,913 B1 7/2017 Mariani et al.
9,734,887 B1 8/2017 Tavva
9,741,409 B2 8/2017 Jones et al.
9,741,447 B2 8/2017 Akamatsu
9,747,971 B2 8/2017 Bains et al.
9,761,297 B1 9/2017 Tomishima
9,786,351 B2 10/2017 Lee et al.
9,799,391 B1 10/2017 Wei
9,805,782 B1 10/2017 Liou
9,805,783 B2 10/2017 Ito et al.
9,818,469 B1 11/2017 Kim et al.
9,847,118 B1 12/2017 Won
9,865,326 B2 1/2018 Bains et al.
9,865,328 B1 1/2018 Desimone et al.
9,922,694 B2 3/2018 Akamatsu
9,934,143 B2 4/2018 Bains et al.
9,953,696 B2 4/2018 Kim
10,032,501 B2 7/2018 Ito et al.
10,083,737 B2 9/2018 Bains et al.
10,090,038 B2 10/2018 Shin
10,134,461 B2 11/2018 Bell et al.
10,147,472 B2 12/2018 Jones et al.
10,153,031 B2 12/2018 Akamatsu
10,170,174 B1 1/2019 Ito et al.
10,176,860 B1 1/2019 Mylavarapu
10,210,925 B2 2/2019 Bains et al.
10,297,305 B1 5/2019 Moon et al.
10,339,994 B2 7/2019 Ito et al.
10,381,327 B2 8/2019 Ramachandra et al.
10,387,276 B2 8/2019 Ryu et al.
10,446,216 B2 10/2019 Oh et al.
10,490,250 B1 11/2019 Ito et al.
10,490,251 B2 11/2019 Wolff
10,600,462 B2 3/2020 Augustine et al.
10,600,491 B2 3/2020 Chou et al.
10,607,686 B2 3/2020 Akamatsu
10,629,286 B2 4/2020 Lee et al.
10,679,710 B2 6/2020 Hirashima et al.
10,705,900 B2 7/2020 Jin
10,770,127 B2 9/2020 Shore et al.
10,811,066 B2 10/2020 Jones et al.
10,832,792 B1 11/2020 Penney et al.
10,861,519 B2 12/2020 Jones et al.
10,867,660 B2 12/2020 Akamatsu
10,930,335 B2 2/2021 Bell et al.
10,943,636 B1 3/2021 Wu et al.
10,950,289 B2 3/2021 Ito et al.
10,964,378 B2 3/2021 Ayyapureddi et al.
11,011,215 B1 5/2021 Parry et al.
11,043,254 B2 6/2021 Enomoto et al.
11,139,015 B2 10/2021 Brown et al.
11,152,050 B2 10/2021 Morohashi et al.
11,158,364 B2 10/2021 Penney et al.
11,158,373 B2 10/2021 Penney et al.
11,200,942 B2 12/2021 Jenkinson et al.
11,222,682 B1 1/2022 Enomoto et al.
11,257,535 B2 2/2022 Shore et al.
11,264,096 B2 3/2022 Schreck et al.
11,322,192 B2 5/2022 Morohashi et al.
11,361,808 B2 6/2022 Bell et al.
11,386,946 B2 7/2022 Ayyapureddi et al.
11,398,265 B2 7/2022 Wu et al.
11,424,005 B2 8/2022 Penney et al.
11,462,291 B2 10/2022 Pan
11,482,275 B2 10/2022 Ayyapureddi et al.
11,521,669 B2 12/2022 Enomoto et al.
11,532,336 B2 12/2022 Choi et al.
11,568,918 B2 1/2023 Ayyapureddi et al.
11,600,314 B2 3/2023 Ayyapureddi et al.
11,600,326 B2 3/2023 Schreck et al.
11,664,063 B2 5/2023 Lovett
11,688,451 B2 6/2023 Zhang et al.
11,694,738 B2 7/2023 Morohashi et al.
11,699,476 B2 7/2023 Brown et al.
11,854,618 B2 12/2023 Penney
11,984,148 B2 5/2024 Penney et al.
12,165,687 B2 12/2024 He et al.
12,217,813 B2 2/2025 Pan
12,236,996 B2 2/2025 Lee et al.

(56) References Cited

U.S. PATENT DOCUMENTS 12,406,717 B2 9/2025 Ayyapureddi et al.
12,592,271 B2 3/2026 Akamatsu et al.
2001/0008498 A1 7/2001 Ooishi
2002/0007476 A1 1/2002 Kishino
2002/0078311 A1 6/2002 Matsuzaki et al.
2002/0080677 A1 6/2002 Watanabe et al.
2002/0181301 A1 12/2002 Takahashi et al.
2003/0063512 A1 4/2003 Takahashi et al.
2003/0067825 A1 4/2003 Shimano et al.
2003/0090400 A1 5/2003 Barker
2003/0095459 A1 5/2003 Derner et al.
2003/0123301 A1 7/2003 Jang et al.
2003/0193829 A1 10/2003 Morgan et al.
2003/0231540 A1 12/2003 Lazar et al.
2004/0004856 A1 1/2004 Sakimura et al.
2004/0008544 A1 1/2004 Shinozaki et al.
2004/0022093 A1 2/2004 Lee
2004/0052142 A1 3/2004 Ikehashi et al.
2004/0114446 A1 6/2004 Takahashi et al.
2004/0130959 A1 7/2004 Kawaguchi
2004/0174757 A1 9/2004 Garverick et al.
2004/0184323 A1 9/2004 Mori et al.
2004/0213035 A1 10/2004 Cavaleri et al.
2004/0218431 A1 11/2004 Chung et al.
2005/0041502 A1 2/2005 Perner
2005/0105315 A1 5/2005 Shin et al.
2005/0243629 A1 11/2005 Lee
2005/0265104 A1 12/2005 Remaklus et al.
2006/0039229 A1 2/2006 Nakano
2006/0059196 A1 3/2006 Sato et al.
2006/0083099 A1 4/2006 Bae et al.
2006/0087903 A1 4/2006 Riho et al.
2006/0119406 A1 6/2006 Henzler et al.
2006/0176744 A1 8/2006 Stave
2006/0262616 A1 11/2006 Chen
2007/0008799 A1 1/2007 Dono et al.
2007/0014174 A1 1/2007 Ohsawa
2007/0028068 A1 2/2007 Golding et al.
2007/0030746 A1 2/2007 Best et al.
2007/0033339 A1 2/2007 Best et al.
2007/0133330 A1 6/2007 Ohsawa
2007/0153611 A1 7/2007 Lee
2007/0230264 A1 10/2007 Eto
2007/0237016 A1 10/2007 Miyamoto et al.
2007/0297252 A1 12/2007 Singh
2008/0028260 A1 1/2008 Oyagi et al.
2008/0031068 A1 2/2008 Yoo et al.
2008/0062742 A1 3/2008 Wang
2008/0126893 A1 5/2008 Harrand et al.
2008/0130394 A1 6/2008 Dono et al.
2008/0181048 A1 7/2008 Han
2008/0224742 A1 9/2008 Pomichter
2008/0253212 A1 10/2008 Iida et al.
2008/0266990 A1 10/2008 Loeffler
2008/0288720 A1 11/2008 Atwal et al.
2008/0301362 A1 12/2008 Cavanna et al.
2008/0313494 A1 12/2008 Hummler et al.
2008/0316845 A1 12/2008 Wang et al.
2009/0021999 A1 1/2009 Tanimura et al.
2009/0059641 A1 3/2009 Jeddeloh
2009/0077571 A1 3/2009 Gara et al.
2009/0161457 A1 6/2009 Wakimoto
2009/0168571 A1 7/2009 Pyo et al.
2009/0185440 A1 7/2009 Lee
2009/0201752 A1 8/2009 Riho et al.
2009/0213675 A1 8/2009 Shino
2009/0251971 A1 10/2009 Futatsuyama
2009/0296510 A1 12/2009 Lee et al.
2010/0005217 A1 1/2010 Jeddeloh
2010/0005376 A1 1/2010 Laberge et al.
2010/0054011 A1 3/2010 Kim
2010/0074042 A1 3/2010 Fukuda et al.
2010/0080074 A1 4/2010 Ohmaru et al.
2010/0110809 A1 5/2010 Kobayashi et al.
2010/0110810 A1 5/2010 Kobayashi
2010/0131812 A1 5/2010 Mohammad
2010/0157693 A1 6/2010 Iwai et al.
2010/0182863 A1 7/2010 Fukiage
2010/0260003 A1 10/2010 Oh
2010/0329069 A1 12/2010 Ito et al.
2011/0026290 A1 2/2011 Noda et al.
2011/0051530 A1 3/2011 Kushida
2011/0055495 A1 3/2011 Remaklus et al.
2011/0069572 A1 3/2011 Lee et al.
2011/0122987 A1 5/2011 Neyer
2011/0216614 A1 9/2011 Hosoe
2011/0225355 A1 9/2011 Kajigaya
2011/0286271 A1 11/2011 Chen
2011/0310648 A1 12/2011 Iwamoto et al.
2011/0317462 A1 12/2011 Gyllenhammer et al.
2012/0014199 A1 1/2012 Narui
2012/0059984 A1 3/2012 Kang et al.
2012/0151131 A1 6/2012 Kilmer et al.
2012/0213021 A1 8/2012 Riho et al.
2012/0254472 A1 10/2012 Ware et al.
2013/0003467 A1 1/2013 Klein
2013/0003477 A1 1/2013 Park et al.
2013/0015578 A1 1/2013 Thacker et al.
2013/0057173 A1 3/2013 Yao et al.
2013/0107623 A1 5/2013 Kavalipurapu et al.
2013/0173971 A1 7/2013 Zimmerman
2013/0254475 A1 9/2013 Perego et al.
2013/0279284 A1 10/2013 Jeong
2013/0304982 A1 11/2013 Jung et al.
2014/0006703 A1 1/2014 Bains et al.
2014/0006704 A1 1/2014 Greenfield et al.
2014/0013169 A1 1/2014 Kobla et al.
2014/0013185 A1 1/2014 Kobla et al.
2014/0050004 A1 2/2014 Mochida
2014/0078841 A1 3/2014 Chopra
2014/0078842 A1 3/2014 Oh et al.
2014/0078845 A1 3/2014 Song
2014/0085995 A1 3/2014 Greenfield et al.
2014/0089576 A1 3/2014 Bains et al.
2014/0095780 A1 4/2014 Bains et al.
2014/0095786 A1 4/2014 Moon et al.
2014/0119091 A1 5/2014 You et al.
2014/0136763 A1 5/2014 Li et al.
2014/0143473 A1 5/2014 Kim et al.
2014/0156923 A1 6/2014 Bains et al.
2014/0177346 A1 6/2014 Gupta et al.
2014/0177370 A1 6/2014 Halbert et al.
2014/0177376 A1 6/2014 Song
2014/0189215 A1 7/2014 Kang et al.
2014/0189228 A1 7/2014 Greenfield et al.
2014/0219043 A1 8/2014 Jones et al.
2014/0237307 A1 8/2014 Kobla et al.
2014/0241099 A1 8/2014 Seo et al.
2014/0254298 A1 9/2014 Dally
2014/0269009 A1 9/2014 Ghosh et al.
2014/0269021 A1 9/2014 Yang et al.
2014/0281206 A1 9/2014 Crawford et al.
2014/0281207 A1 9/2014 Mandava et al.
2014/0292375 A1 10/2014 Angelini et al.
2014/0293725 A1 10/2014 Best et al.
2014/0317344 A1 10/2014 Kim
2014/0355332 A1 12/2014 Youn et al.
2014/0369109 A1 12/2014 Lee et al.
2014/0379978 A1 12/2014 Kim et al.
2015/0049567 A1 2/2015 Ch
2015/0055420 A1 2/2015 Bell et al.
2015/0063016 A1 3/2015 Shimizu
2015/0078112 A1 3/2015 Huang
2015/0089326 A1 3/2015 Joo et al.
2015/0155027 A1 6/2015 Abe et al.
2015/0162067 A1 6/2015 Kim et al.
2015/0170728 A1 6/2015 Jung et al.
2015/0199126 A1 7/2015 Jayasena et al.
2015/0206572 A1 7/2015 Lim et al.
2015/0213872 A1 7/2015 Mazurder et al.
2015/0213877 A1 7/2015 Darel
2015/0228341 A1 8/2015 Watanabe et al.
2015/0243339 A1 8/2015 Bell et al.
2015/0255140 A1 9/2015 Song

(56) References Cited

U.S. PATENT DOCUMENTS

2015/0262652 A1 9/2015 Igarashi
2015/0279441 A1 10/2015 Greenberg et al.
2015/0279442 A1 10/2015 Hwang
2015/0294711 A1 10/2015 Gaither et al.
2015/0340077 A1 11/2015 Akamatsu
2015/0356048 A1 12/2015 King
2015/0371699 A1 12/2015 Lee et al.
2016/0019940 A1 1/2016 Jang et al.
2016/0027498 A1 1/2016 Ware et al.
2016/0027531 A1 1/2016 Jones et al.
2016/0027532 A1 1/2016 Kim
2016/0042782 A1 2/2016 Narui et al.
2016/0071581 A1 3/2016 Lee
2016/0078845 A1 3/2016 Lin et al.
2016/0078911 A1 3/2016 Fujiwara et al.
2016/0078918 A1 3/2016 Hyun et al.
2016/0085466 A1 3/2016 Benedict et al.
2016/0086649 A1 3/2016 Hong et al.
2016/0086651 A1 3/2016 Kim
2016/0093402 A1 3/2016 Kitagawa et al.
2016/0099043 A1 4/2016 Tu
2016/0111140 A1 4/2016 Joo et al.
2016/0125931 A1 5/2016 Doo et al.
2016/0133314 A1 5/2016 Hwang et al.
2016/0140243 A1 5/2016 Adams et al.
2016/0163372 A1 6/2016 Lee et al.
2016/0172056 A1 6/2016 Huh
2016/0180917 A1 6/2016 Chishti et al.
2016/0180921 A1 6/2016 Jeong
2016/0196863 A1 7/2016 Shin et al.
2016/0202926 A1 7/2016 Benedict
2016/0211008 A1 7/2016 Benedict et al.
2016/0224262 A1 8/2016 Mandava et al.
2016/0225433 A1 8/2016 Bains et al.
2016/0225461 A1 8/2016 Tuers et al.
2016/0246525 A1 8/2016 Jeffrey et al.
2016/0336060 A1 11/2016 Shin
2016/0343423 A1 11/2016 Shido
2017/0011792 A1 1/2017 Oh et al.
2017/0076779 A1 3/2017 Bains et al.
2017/0092350 A1 3/2017 Halbert et al.
2017/0117030 A1 4/2017 Fisch et al.
2017/0133085 A1 5/2017 Kim et al.
2017/0139641 A1 5/2017 Cha et al.
2017/0140807 A1 5/2017 Sun et al.
2017/0140811 A1 5/2017 Joo
2017/0148504 A1 5/2017 Saifuddin et al.
2017/0177246 A1 6/2017 Miller et al.
2017/0186481 A1 6/2017 Oh et al.
2017/0213586 A1 7/2017 Kang et al.
2017/0221546 A1 8/2017 Loh et al.
2017/0263305 A1 9/2017 Cho
2017/0287547 A1 10/2017 Ito et al.
2017/0323675 A1 11/2017 Jones et al.
2017/0352399 A1 12/2017 Yokoyama et al.
2017/0371742 A1 12/2017 Shim et al.
2017/0372767 A1 12/2017 Kang et al.
2018/0004592 A1 1/2018 Bains et al.
2018/0005690 A1 1/2018 Morgan et al.
2018/0025770 A1 1/2018 Ito et al.
2018/0025772 A1 1/2018 Lee et al.
2018/0060194 A1 3/2018 Ryu et al.
2018/0061483 A1 3/2018 Morgan
2018/0082737 A1 3/2018 Lee
2018/0084314 A1 3/2018 Koyama
2018/0090199 A1 3/2018 Kim et al.
2018/0096719 A1 4/2018 Tomishima et al.
2018/0102776 A1 4/2018 Chandrasekar et al.
2018/0107417 A1 4/2018 Shechter et al.
2018/0114561 A1 4/2018 Fisch et al.
2018/0114565 A1 4/2018 Lee
2018/0158504 A1 6/2018 Akamatsu
2018/0158507 A1 6/2018 Bang
2018/0182445 A1 6/2018 Lee et al.
2018/0203621 A1 7/2018 Ahn et al.
2018/0218767 A1 8/2018 Wolff
2018/0261268 A1 9/2018 Hyun et al.
2018/0294028 A1 10/2018 Lee et al.
2018/0308539 A1 10/2018 Ito et al.
2018/0341553 A1 11/2018 Koudele et al.
2018/0342282 A1 11/2018 Morgan
2018/0366182 A1 12/2018 Hyun et al.
2019/0013059 A1 1/2019 Akamatsu
2019/0043558 A1 2/2019 Suh et al.
2019/0051344 A1 2/2019 Bell et al.
2019/0066759 A1 2/2019 Nale
2019/0066762 A1 2/2019 Koya
2019/0066808 A1 2/2019 Nale
2019/0088315 A1 3/2019 Saenz et al.
2019/0088316 A1 3/2019 Inuzuka et al.
2019/0096492 A1 3/2019 Cai et al.
2019/0103147 A1 4/2019 Jones et al.
2019/0130961 A1 5/2019 Bell et al.
2019/0139599 A1 5/2019 Ito et al.
2019/0147941 A1 5/2019 Qin et al.
2019/0147964 A1 5/2019 Yun et al.
2019/0161341 A1 5/2019 Howe
2019/0172518 A1 6/2019 Chen et al.
2019/0172521 A1 6/2019 Morgan
2019/0187745 A1 6/2019 Murali et al.
2019/0196730 A1 6/2019 Imran
2019/0198078 A1 6/2019 Hoang et al.
2019/0198090 A1 6/2019 Lee
2019/0198099 A1 6/2019 Mirichigni et al.
2019/0205253 A1 7/2019 Roberts
2019/0207736 A1 7/2019 Ben-tovim et al.
2019/0228810 A1 7/2019 Jones et al.
2019/0228813 A1 7/2019 Nale et al.
2019/0228815 A1 7/2019 Morohashi et al.
2019/0237131 A1 8/2019 Ito
2019/0237132 A1 8/2019 Morohashi
2019/0243708 A1 8/2019 Cha et al.
2019/0252020 A1 8/2019 Rios et al.
2019/0267077 A1 8/2019 Ito et al.
2019/0279706 A1 9/2019 Kim
2019/0333573 A1 10/2019 Shin et al.
2019/0347019 A1 11/2019 Shin et al.
2019/0348100 A1 11/2019 Smith et al.
2019/0348102 A1 11/2019 Smith et al.
2019/0348103 A1 11/2019 Jeong et al.
2019/0348107 A1 11/2019 Shin et al.
2019/0349545 A1 11/2019 Koh et al.
2019/0362774 A1 11/2019 Kuramori et al.
2019/0371391 A1 12/2019 Cha et al.
2019/0385661 A1 12/2019 Koo et al.
2019/0385667 A1 12/2019 Morohashi et al.
2019/0386557 A1 12/2019 Wang et al.
2020/0005857 A1 1/2020 Ito et al.
2020/0075106 A1 3/2020 Tokutomi et al.
2020/0082873 A1 3/2020 Wolff
2020/0090760 A1 3/2020 Purahmad et al.
2020/0135263 A1 4/2020 Brown et al.
2020/0194050 A1 6/2020 Akamatsu
2020/0194056 A1 6/2020 Sakurai et al.
2020/0201380 A1 6/2020 Murali et al.
2020/0202921 A1 6/2020 Morohashi et al.
2020/0211626 A1 7/2020 Hiscock et al.
2020/0211633 A1 7/2020 Okuma
2020/0211636 A1 7/2020 Hiscock et al.
2020/0251158 A1 8/2020 Shore et al.
2020/0294576 A1 9/2020 Brown et al.
2020/0302994 A1 9/2020 Enomoto et al.
2020/0321049 A1 10/2020 Meier et al.
2020/0333451 A1* 10/2020 Wei ........................ G01S 13/56
2020/0349995 A1 11/2020 Shore et al.
2020/0365208 A1 11/2020 Schreck et al.
2020/0381040 A1 12/2020 Penney et al.
2020/0395072 A1 12/2020 Penney et al.
2020/0411095 A1 12/2020 Kim
2021/0005229 A1 1/2021 Hiscock et al.
2021/0005240 A1 1/2021 Brown et al.
2021/0020223 A1 1/2021 Ayyapureddi et al.
2021/0020262 A1 1/2021 Penney et al.
2021/0026732 A1 1/2021 Park et al.

(56) References Cited

U.S. PATENT DOCUMENTS

| | | | |
|---|---|---|---|
| 2021/0057012 | A1 | 2/2021 | Ayyapureddi et al. |
| 2021/0057013 | A1 | 2/2021 | Jenkinson et al. |
| 2021/0057021 | A1 | 2/2021 | Wu et al. |
| 2021/0057022 | A1 | 2/2021 | Jenkinson et al. |
| 2021/0065755 | A1 | 3/2021 | Kim et al. |
| 2021/0065764 | A1 | 3/2021 | Cheng et al. |
| 2021/0142852 | A1 | 5/2021 | Schreck et al. |
| 2021/0158851 | A1 | 5/2021 | Ayyapureddi et al. |
| 2021/0158860 | A1 | 5/2021 | Wu et al. |
| 2021/0158861 | A1 | 5/2021 | Jeong et al. |
| 2021/0201984 | A1 | 7/2021 | Khasawneh et al. |
| 2021/0225432 | A1 | 7/2021 | Enomoto et al. |
| 2021/0241810 | A1 | 8/2021 | Hollis et al. |
| 2021/0265504 | A1 | 8/2021 | Ishizu et al. |
| 2021/0343324 | A1 | 11/2021 | Brown et al. |
| 2021/0350844 | A1 | 11/2021 | Morohashi et al. |
| 2021/0398592 | A1 | 12/2021 | Penney et al. |
| 2021/0407583 | A1 | 12/2021 | Penney et al. |
| 2022/0051716 | A1* | 2/2022 | Ayyapureddi ...... G11C 11/4076 |
| 2022/0068348 | A1 | 3/2022 | Bennett et al. |
| 2022/0069992 | A1 | 3/2022 | Ayyapureddi |
| 2022/0165347 | A1 | 5/2022 | Pan |
| 2022/0230672 | A1 | 7/2022 | Ayyapureddi et al. |
| 2022/0293166 | A1 | 9/2022 | Ayyapureddi et al. |
| 2022/0415427 | A1 | 12/2022 | Pan |
| 2023/0010619 | A1 | 1/2023 | Ayyapureddi et al. |
| 2023/0047007 | A1 | 2/2023 | Lovett |
| 2023/0096256 | A1 | 3/2023 | Sasaki et al. |
| 2023/0170008 | A1* | 6/2023 | Zhang ................ G11C 11/4078 365/222 |
| 2023/0205428 | A1 | 6/2023 | Kim et al. |
| 2023/0206980 | A1 | 6/2023 | He et al. |
| 2023/0206989 | A1 | 6/2023 | He et al. |
| 2024/0038292 | A1 | 2/2024 | Kim et al. |
| 2024/0069757 | A1 | 2/2024 | Ko et al. |
| 2024/0135980 | A1 | 4/2024 | Lee et al. |
| 2024/0144988 | A1 | 5/2024 | Seo et al. |
| 2024/0212738 | A1 | 6/2024 | Akamatsu et al. |
| 2025/0068345 | A1 | 2/2025 | Lu et al. |
| 2025/0124963 | A1 | 4/2025 | Lu |
| 2025/0124964 | A1 | 4/2025 | Lu et al. |
| 2025/0131972 | A1 | 4/2025 | Pan |
| 2026/0024571 | A1 | 1/2026 | Ayyapureddi et al. |

FOREIGN PATENT DOCUMENTS

| | | | |
|---|---|---|---|
| CN | 1371100 | A | 9/2002 |
| CN | 101038785 | A | 9/2007 |
| CN | 101067972 | A | 11/2007 |
| CN | 101331554 | A | 12/2008 |
| CN | 101346775 | A | 1/2009 |
| CN | 101458658 | A | 6/2009 |
| CN | 101595528 | A | 12/2009 |
| CN | 101622607 | A | 1/2010 |
| CN | 102074268 | A | 5/2011 |
| CN | 102113058 | A | 6/2011 |
| CN | 102364991 | A | 2/2012 |
| CN | 102467976 | A | 5/2012 |
| CN | 102483952 | A | 5/2012 |
| CN | 103366808 | A | 10/2013 |
| CN | 103544987 | A | 1/2014 |
| CN | 103928048 | A | 7/2014 |
| CN | 104183264 | A | 12/2014 |
| CN | 104350546 | A | 2/2015 |
| CN | 104462011 | A | 3/2015 |
| CN | 105493188 | A | 4/2016 |
| CN | 105814636 | A | 7/2016 |
| CN | 106710621 | A | 5/2017 |
| CN | 107256717 | A | 10/2017 |
| CN | 107871516 | A | 4/2018 |
| CN | 108122581 | A | 6/2018 |
| CN | 108154895 | A | 6/2018 |
| CN | 109074305 | A | 12/2018 |
| CN | 109285576 | A | 1/2019 |
| CN | 109408898 | A | 3/2019 |
| CN | 110827884 | A | 2/2020 |
| CN | 111247586 | A | 6/2020 |
| CN | 112185443 | A | 1/2021 |
| CN | 113330518 | A | 8/2021 |
| CN | 113544779 | A | 10/2021 |
| EP | 2549482 | A1 | 1/2013 |
| JP | H03164866 | A | 7/1991 |
| JP | H0773682 | A | 3/1995 |
| JP | H10241385 | A | 9/1998 |
| JP | 2005-216429 | A | 8/2005 |
| JP | 2011-258259 | A | 12/2011 |
| JP | 4911510 | B2 | 1/2012 |
| JP | 2012190506 | A | 10/2012 |
| JP | 2013-004158 | A | 1/2013 |
| KR | 20140112164 | A | 9/2014 |
| KR | 20150002112 | A | 1/2015 |
| KR | 20150002783 | A | 1/2015 |
| KR | 20170058022 | A | 5/2017 |
| KR | 20180064940 | A | 6/2018 |
| KR | 1020180064940 | A | 6/2018 |
| KR | 1020180085184 | A | 7/2018 |
| KR | 20190048049 | A | 5/2019 |
| KR | 20190102580 | A | 9/2019 |
| WO | 2014120477 | A1 | 8/2014 |
| WO | 2015030991 | A1 | 3/2015 |
| WO | 2017171927 | A1 | 10/2017 |
| WO | 2018217582 | A2 | 11/2018 |
| WO | 2019222960 | A1 | 11/2019 |
| WO | 2020010010 | A1 | 1/2020 |
| WO | 2020191222 | A1 | 9/2020 |
| WO | 2021003085 | A1 | 1/2021 |
| WO | 2022108808 | A1 | 5/2022 |

OTHER PUBLICATIONS

U.S. Appl. No. 19/292,661 titled “Apparatuses and Methods for Dynamically Allocated Aggressor Detection” filed Aug. 6, 2025, pp. all pages of the application as filed.

Kim, et al. “Flipping Bits in Memory Without Accessing Them: An Experimental Study of DRAM Disturbance Errors” , IEEE, Jun. 2014; pp. all.

Stout, Thomas , et al. “Voltage Source Based Voltage-to-Time Converter”, IEEE, downloaded Jul. 2020, pp. all.

Zheng, Bin , et al. “Design of Built-in DRAM for TFT-LCD Driver Chip “LCD and display,” Issue 4”, Aug. 15, 2009; pp. all.

U.S. Appl. No. 18/743,783 titled “Apparatuses and Methods for Per-Row Count Based Refresh Target Identification” filed Jun. 14, 2024, pp. all pages of the application as filed.

U.S. Appl. No. 18/744,988 titled “Apparatuses and Methods for Per-Row Count Based Refresh Target Identification With Sorting” filed Jun. 17, 2024, pp. all pages of the application as filed.

U.S. Appl. No. 18/745,068 titled “Apparatuses and Methods for Per Row Activation Counter Testing” filed Jun. 17, 2024, pp. all pages of the application as filed.

U.S. Appl. No. 19/695,979, titled “Apparatuses and Methods for Per-Row Count Based Refresh Target Identification”, filed Jun. 2, 2026, pp. all pages of application as filed.

* cited by examiner 300
340
Base MT
MT Step
350
MT Calculation
352
Used Slot
MT
XADD
354
Mitigation FIFO & Control
HitXADD
342
Victim Calculation
RXADD
344
Mitigation Circuit
FIFO Full Flag
339
Alert
334
MR
CmdDec
336
Ref
338
DQ
332
DRDW
314
340
XDEC
RHR
GIO
Lio
310
312
324
Bank Logic
322
DSA
320
330

APPARATUSES AND METHODS FOR AGGRESSOR QUEUE BASED MITIGATION THRESHOLD

CROSS REFERENCE TO RELATED APPLICATION(S)

This application claims the benefit under 35 U.S.C. § 119 of the earlier filing date of U.S. Provisional Application Ser. No. 63/509,571 filed Jun. 22, 2023, the entire contents of which are hereby incorporated by reference in its entirety for any purpose.

BACKGROUND

Information may be stored on memory cells of a memory device. The memory cells may be organized at the intersection of word lines (rows) and bit lines (columns). Information in the memory cells may decay over time. For example, the information may be stored as a charge on a capacitor which may decay over time. The memory device may perform refresh operations to restore the information and prevent information from being lost.

Certain patterns of access may cause an increased rate of information decay in nearby memory cells (e.g., the memory cells along nearby word lines). Memory devices may use various schemes to identify these access patterns so that additional targeted refresh operations may be performed. Some patterns of access may overwhelm the memory's ability to perform targeted refresh operations and it may request additional time for targeted refresh operations from the controller. There may be a need to reduce the circumstances in which the memory needs to request such additional time.

DETAILED DESCRIPTION

Figure 1:
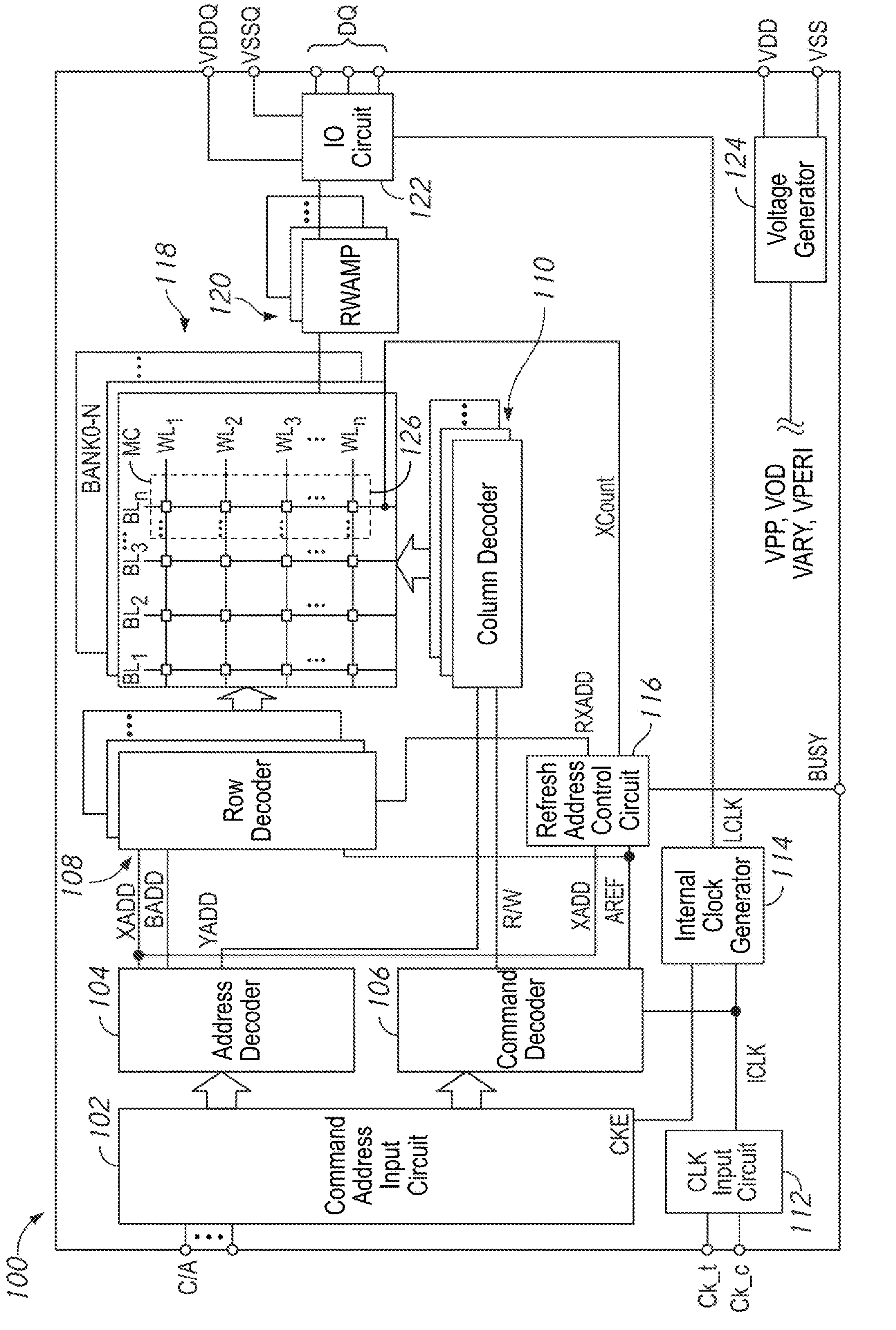
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. During an example access operation a word line may be activated based on a row address and then selected memory cells along that active word line may have their information read or written to based on which bit lines are accessed, which may be based on a column address. The memory array may be refreshed on a row by row basis (e.g., as part of an auto-refresh and/or self-refresh mode) where the memory cells along each row are refreshed periodically. The speed at which the rows are refreshed (e.g., the maximum time any given row will go between refreshes) may be determined based on an expected rate of information decay.

Various patterns of access to a row (an aggressor row) may cause an increased rate of information decay in nearby memory cells (e.g., along victim rows). For example, a 'row hammer' may involve repeated accesses to the aggressor row which may increase a rate of decay in adjacent rows (and/or in rows which are further away). Accordingly, it may be important to track a number of accesses to each row to determine if they are aggressors, such that the victim rows can be identified and refreshed as part of a targeted refresh operation. For example, each word line may have an associated count value which is used to determine how many times that word line has been accessed.

When the row is accessed the count may be changed (e.g., incremented) and compared to a mitigation threshold. If the count crosses the mitigation threshold, then the address may be added to an aggressor queue. Addresses are removed from the queue when a targeted refresh operation is performed. If addresses are being added faster than they are being removed, then the queue may become full. Since subsequent aggressor addresses could be lost, which might endanger data integrity, when the aggressor queue becomes full the memory may send an alert signal to a controller. The controller may take one or more actions to allow for more targeted refresh operations to occur (e.g., by pausing access operations, sending a refresh management command, or combinations thereof). However, this may reduce the availability of the memory, which is undesirable. The mitigation threshold may be set at a level based on a 'worst case' scenario, which may make it easy to add addresses to the queue, leading to situations where the queue fills up too quickly. Accordingly, there is a need for better aggressor queue management.

The present disclosure is drawn to apparatuses, systems, and methods for aggressor queue based mitigation threshold management. The mitigation threshold may be set based on a number of slots in the aggressor queue which are filled with aggressor addresses. In an example implementation, when the aggressor queue is empty (no slots are filled) the mitigation threshold may be set to a minimum value. As the queue fills up (as more slots are filled) the mitigation threshold increases up to a maximum value (which may be reached when the queue is full in some embodiments or may be reached before the queue is full in some embodiments). The maximum mitigation threshold may still be below a danger level where damage is expected to occur before a targeted refresh can be performed. By increasing the threshold based on the number of filled slots, it takes fewer accesses for a row to be added when the queue is empty and more as the queue fills up. This allows for more lenient conditions for identifying aggressors when there is plentiful storage space for aggressors, but more strict criteria as space in the queue becomes more scarce. Accordingly, rows with relatively low counts may be refreshed when targeted refreshes are happening rapidly compared to the rate at which aggressors are identified, but only rows which are in more danger are refreshed when many aggressors have been identified rapidly. This may help reduce situations in which the queue becomes full and controller intervention is called for, thus helping to increase uptime of the memory device.

FIG. 1 is a block diagram of a semiconductor device according to at least one embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL (rows), a plurality of bit lines BL (columns), and a plurality of memory cells MC arranged at intersections of the plurality of word lines WL and the plurality of bit lines BL.

The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL.

Some of the memory cells may be set aside as counter memory cells 126. The counter memory cells may store count values XCount, each of which is associated with one of the word lines. Each count value XCount may be stored in counter memory cells 126 along the word line that the count value is associated with. The count value XCount may be stored as a binary number, with each bit stored in a memory cell along the word line. For the sake of clarity, a single bit line of counter memory cells 126 is shown in FIG. 1. The number of counter memory cells along each word line may be based on a number of bits of the count value XCount. In some embodiments, extra counter memory cells (e.g., more than the length of the number XCount) may be used, for example to store error correction information for the count value XCount.

The counter memory cells 126 may be referred to as such due to their use (storing the count values) and in some embodiments may be structurally similar to, or identical to, the other memory cells of the array. In some embodiments, the counter memory cells 126 may be grouped together (e.g., at the end of the word line). Other distributions of the counter memory cells 126 along the word line may be used in other example embodiments. In some embodiments, the counter memory cells 126 may not be directly accessible by external devices such as controllers (e.g., to prevent the count values from being overwritten). In other words, the bit lines associated with the counter memory cells 126 may not be accessed by a normal column address.

The semiconductor device 100 may employ a plurality of external terminals that include command and address (C/A) terminals coupled to a command and address bus to receive commands and addresses, and a CS signal, clock terminals to receive clocks CK and /CK, data terminals DQ to provide data, and power supply terminals to receive power supply potentials VDD, VSS, VDDQ, and VSSQ.

The clock terminals are supplied with external clocks CK and /CK that are provided to an input circuit 112. The external clocks may be complementary. The input circuit 112 generates an internal clock ICLK based on the CK and /CK clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a row activation command ACT. When the row activation command ACT is received, a bank address BADD and a row address XADD are timely supplied with the row activation command ACT.

The device 100 may receive an access command which is a read command. When a read command is received, and a bank address BADD and a column address YADD are timely supplied with the read command, read data is read from memory cells in the memory array 118 corresponding to the row address XADD and column address YADD. The read command is received by the command decoder 106, which provides internal commands so that read data from the memory array 118 is provided to the read/write amplifiers 120. The read data is output to outside from the data terminals DQ via the input/output circuit 122. The access count XCount is stored counter memory cells 126 of the row associated with the row address XADD are read to the refresh address control circuit 116, and an updated value of the access count XCount' is written back to the counter memory cells 126 of the row XADD.

The device 100 may receive an access command which is a write command. When the write command is received, and a bank address BADD and a column address YADD are timely supplied with the write command, write data supplied to the data terminals DQ is written to a memory cells in the memory array 118 corresponding to the row address and column address. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 to the read/write amplifiers 120, and by the read/write amplifiers 120 to the memory array 118 to be written into the memory cell MC. Similar to the read operation described above, the access count Xcount stored in counter memory cells 126 of the row associated with the row address XADD are read to the refresh address control circuit 116, and an updated value of the access count Xcount' is written back to the counter memory cells 126 of the row XADD.

The device 100 may also receive commands causing it to carry out refresh operations. For example, a controller of the memory may put the device 100 into an auto-refresh mode and provide an auto-refresh signal AREF. The device 100 may also enter a self-refresh mode where the refresh signal is generated internally. Since other than the source of the refresh signal, the two operations may generally be similar, the present disclosure will generally describe auto-refresh operations (for example the refresh signal may be referred to as an 'auto-refresh signal'). However, it should be understood that the present disclosure may apply to self-refresh (or other refresh modes) as well.

The refresh signal AREF may be a pulse signal which is activated when the command decoder 106 receives a signal which indicates an auto-refresh command. In some embodiments, the auto-refresh command may be externally issued to the memory device 100. In some embodiments, the auto-refresh command may be periodically generated by a component of the device (e.g., as part of a self-refresh mode). In some embodiments, when an external signal indicates a self-refresh entry command, the refresh signal AREF may also be activated. The refresh signal AREF may be activated once immediately after command input, and thereafter may be cyclically activated at desired internal timing. Thus, refresh operations may continue automatically. A self-refresh exit command may cause the automatic activation of the refresh signal AREF to stop and return to an IDLE state.

The refresh signal AREF is supplied to the refresh address control circuit 116. The refresh address control circuit 116 supplies a refresh row address RXADD to the row decoder 108, which refreshes a wordline WL identified by the refresh row address RXADD. The refresh address control circuit 116 controls a type of refresh operation with timing based on the refresh signal AREF, and generates and provides the refresh address RXADD. The refresh address control circuit 116 may be controlled to change details of the refreshing address RXADD (e.g., how the refresh address is calculated, the timing of the refresh addresses), or may operate based on internal logic.

The refresh address control circuit 116 may selectively output a targeted refresh address (e.g., a victim address) or a sequential refresh address (e.g., an auto-refresh address) as the refreshing address RXADD. The sequential refresh addresses may be a sequence of addresses which are provided based on activations of the auto-refresh signal AREF. The refresh address control circuit 116 may cycle through the sequence of sequential addresses at a rate determined by AREF. In some embodiments, the sequence of sequential addresses may include all the addresses in the memory bank 118. In some embodiments, the auto-refresh signal AREF may be issued with a frequency such that most or all of the addresses in the memory bank 118 are refreshed within a certain period (e.g., such that there is a maximum specified time between two consecutive sequential refreshes of a given word line), which may be based on an expected rate at which information in the memory cells MC decays.

The refresh address control circuit 116 may also determine targeted refresh addresses which are addresses that require refreshing (e.g., victim addresses corresponding to victim rows) based on the access pattern of nearby addresses (e.g., aggressor addresses associated with aggressor rows) in the memory array 118. The refresh address control circuit 116 may monitor accesses to the different wordlines WL of the memory bank. When the row decoder 108 sends an access command to a particular row, the counter memory cells 126 along that row may have their information read to the refresh address control circuit 116 as the access count Xcount (along with any redundant information for error correction). The refresh address control circuit 116 may determine an access count of the row based on the values of the bits of the access count XCount.

The refresh address control circuit 116 may update the count value and determine if the accessed row is an aggressor row based on the updated count value XCount'. For example, the updated count value XCount' may be compared to a mitigation threshold MT (or threshold). If the updated count value XCount' crosses the threshold (or meets/crosses MT) then the current row address may be judged to be an aggressor. If the current row is not an aggressor row, then the updated count value XCount' may be written back to the counter memory cells 126 of the accessed word line. In some embodiments, the refresh address control circuit 116 may update the count value by decreasing the count value XCount. For example, with each access, the value of XCount may be decremented.

If the refresh address control circuit 116 determines that the accessed row is an aggressor, then the refresh address control circuit 116 may identify the row address XADD of the current word line as an aggressor address. The identified aggressor address is added to an aggressor address queue (or aggressor queue) for future targeted refresh operations. During a targeted refresh operation the aggressor address in the queue may be used to determine one or more victim row addresses and provide them as a refresh address RXADD. When the accessed row is determined to be an aggressor, the access count XCount associated with that row may be changed. For example the access count may be reset (e.g., to an initial value) or decreased (e.g., by an amount based on the mitigation threshold). In some embodiments, the threshold may be a maximum value of the count XCount, and when the count is increased past the threshold, the count may roll over back to an initial value.

The refresh control circuit 116 sets a value of the mitigation threshold based on how full the aggressor queue is. The mitigation threshold may start at an initial value close to an initial state of the counters when the queue is empty and move further away from an initial state of the counters as the queue fills up. For example, if the count values increase with each access at start at an initial value of 0 (or near 0), then the mitigation threshold may start at a minimum value and then increase as the queue becomes more full. For example, each time an aggressor address is added to the queue the mitigation threshold goes up and each time an aggressor address is removed from the queue (e.g., due to a targeted refresh operation) the mitigation threshold goes down.

The refresh address RXADD may be provided with a timing based on a timing of the refresh signal AREF. The refresh address control circuit 116 may have time slots corresponding to the timing of AREF, and may provide one or more refresh addresses RXADD during each time slot. In some embodiments, the targeted refresh address may be issued in (e.g., "steal") a time slot which would otherwise have been assigned to an auto-refresh address. In some embodiments, certain time slots may be reserved for targeted refresh addresses, and the refresh address control circuit 116 may determine whether to provide a targeted refresh address, not provide an address during that time slot, or provide an auto-refresh address instead during the time slot.

The refresh address control circuit 116 may use different methods to calculate a targeted refresh address based on a row address XADD identified as an aggressor address based on the access count. For example, the refresh address control circuit 116 may determine if a given row is an aggressor address, and then calculate and provide addresses corresponding to victim addresses of the aggressor address as the targeted refresh address. For example the victim addresses may include word lines adjacent to the aggressor word line (e.g., XADD+1 and XADD−1) and/or may include wordlines further away (e.g., XADD+/−2, XADD+/−3, etc.). In some embodiments, more than one victim address may correspond to a given aggressor address. In this case the refresh address control circuit may queue up multiple targeted refresh addresses, and provide them sequentially when it determines that a targeted refresh address should be provided. The refresh address control circuit 116 may provide the targeted refresh address right away, or may queue up the targeted refresh address to be provided at a later time (e.g., in the next time slot available for a targeted refresh).

The power supply terminals are supplied with power supply potentials VDD and VSS. The power supply potentials VDD and VSS are supplied to an internal voltage generator circuit 124. The internal voltage generator circuit 124 generates various internal potentials VPP, VARY, VPERI, and the like based on the power supply potentials VDD and VSS supplied to the power supply terminals. The internal potential VPP is mainly used in the row decoder 108, the internal potentials VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
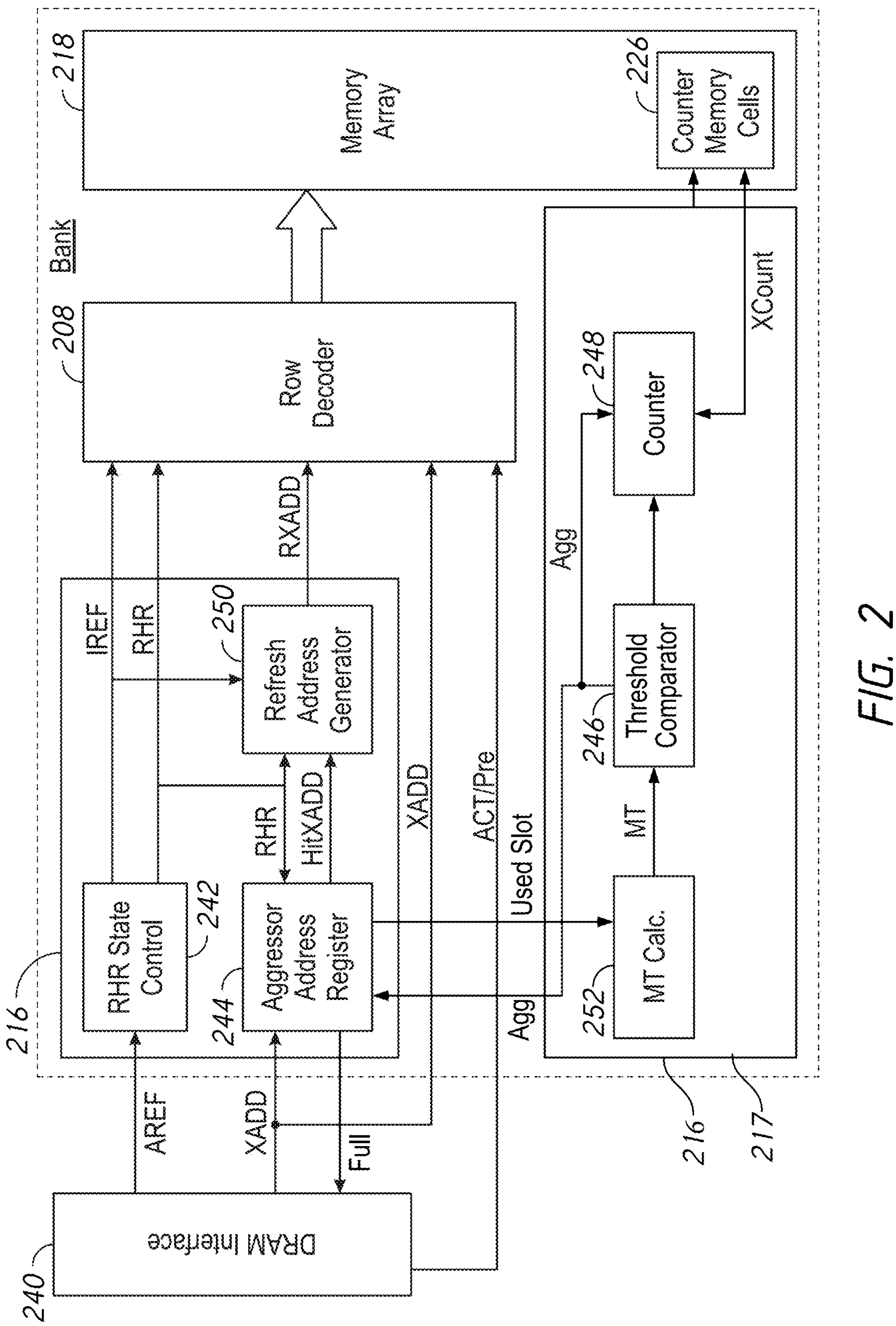
FIG. 2 is a block diagram of a refresh control circuit according to an embodiment of the present disclosure.

FIG. 2 is a block diagram of a refresh control circuit according to an embodiment of the present disclosure. FIG. 2 may show an example layout which may implement a portion of a memory device, such as the memory device 100 of FIG. 1. For example, the memory array 218 may implement the memory array 118 of FIG. 1, the row decoder 208 may implement the row decoder 108 of FIG. 1, the refresh control circuit 216 may implement the refresh control circuit 116 of FIG. 1 and so forth.

Certain internal components and signals of the refresh address control circuit 216 are shown to illustrate the operation of the refresh address control circuit 216. For example, the refresh control circuit 216 may include an RHR state control circuit 242 which determines if sequential or targeted refreshes are performed, an aggressor address register or aggressor address queue 244 which stores identified aggressor addresses, and a refresh address generator 250 which generates the refresh address RXADD. Also shown are a counter circuit 248 which adjusts the count values XCount stored in the counter memory cells 226 of the array 218, a threshold comparator circuit 246 which determines if those counts are above a mitigation threshold MT, and a mitigation threshold calculator circuit 252 which sets a level of MT based on a state of the aggressor queue 244. The counter circuit 248, threshold comparator circuit 246, and MT calculator circuit 252 may work together as an aggressor detector circuit 217.

The dotted line around the refresh address control circuit 216, the row decoder 208, and the memory array 218 is shown to represent that in certain embodiments, each of the components within the dotted line may correspond to a particular bank of memory, and that these components may be repeated for each of the banks of memory. In some embodiments, the components shown within the dotted line may be associated with each of the memory banks. Thus, there may be multiple refresh address control circuits 216 and row decoders 208. For the sake of brevity, components for only a single bank will be described.

FIG. 2 shows components, such as the counter 248, mitigation threshold calculator circuit 252, and threshold comparator 246 grouped together as part of the refresh control circuit 216. However, one or more of these components may be spatially distributed throughout the memory. For example, the aggressor detector circuit 217 including the counter circuit 248, mitigation threshold calculator circuit 252, and threshold comparator 246 may be spatially located in a logic region closer to each word line while the other components of the refresh control circuit may be in a bank logic region. To represent the spatial distribution, two separate boxes are shown for the refresh control circuit 216 with the lower box representing the components of the aggressor detector circuit 217. Other distributions may be used in other example embodiments.

A DRAM interface 240 may provide one or more signals to an address refresh control circuit 216 and row decoder 208 which in turn (along with a column decoder, not shown) may perform access operation on a memory array 218. When a row of the memory array 218 is accessed, the values of the counter memory cells 226 along that row are read to the counter circuit 248. For example, the counter memory cells 226 may store the bits of a binary number that represents the count value. For example, if the number is a 16-bit number, then 16 or more counter memory cells may store the bits of the number. In some embodiments, the counter memory cells 226 may provide additional information which may be used for the count error correction.

The counter 248 may determine a value of the access count for that row based on the values read from the counter memory cells 226. The counter 248 may be a count control circuit, which may manage a value of the count stored in the counter memory cells 226 (e.g., by reading the raw data in the counter memory cells 226 as a numerical value, writing new numerical values to the counter memory cells 226 etc.). The counter circuit 248 may change the count value (e.g., by incrementing the count value) and provide the changed count value to a threshold comparator 246, which may determine if the value of the changed count crosses a threshold MT (e.g., if the value is greater than or greater than or equal to the threshold). If the value does not cross the threshold (e.g., if the value is less than or equal to or less than the threshold), then the counter circuit 248 may write the changed count back to the counter memory cells 226. If the value does cross the threshold, then the current address XADD may be determined to be an aggressor address HitXADD and the threshold comparator circuit 246 provides an aggressor detected signal Agg to the aggressor queue 244. Responsive to the signal Agg, the aggressor address register 244 stores the row address XADD. Also responsive to the signal Agg, the counter circuit 248 may change the count value XCount. In some embodiments, the count value may be reset (e.g., to an initial value) or changed in an opposite direction than the direction it is changed responsive to an access (e.g., if the count is increased for an access, it may be decreased responsive to signal Agg). In some embodiments, the changing of the count value may be inherent. For example, the mitigation threshold MT may be set as a maximum value of the count value XCount, and when XCount reaches that threshold and is incremented again, the count may roll over back to an initial value (e.g., 0).

The aggressor address register 244 includes a number of 'slots' each of which has the capacity to store a row address which has been identified as an aggressor HitXADD. For example, the slots may represent a number of latches which can store the bits of the row address. The aggressor queue may have a number of slots (or depth) which represents how many aggressor addresses may be stored at one time. The aggressor address register 244 provides a signal UsedSlot which indicates how many of the slots are currently full. The aggressor queue 244 also provides a signal Full when all of the slots include an address. Responsive to the signal Full, the DRAM interface 240 may provide an alert signal to a controller of the memory.

The mitigation threshold calculation circuit 252 sets a value of the mitigation threshold MT based on a state of the aggressor address register 244. The mitigation threshold calculation circuit 252 calculates a value of the mitigation threshold MT based on the signal UsedSlot from the aggressor address register 244. The mitigation threshold calculation circuit 252 may use any method to generate the mitigation threshold based on UsedSlot. For example a linear function, non-linear function, or step function may be used.

In an example embodiment where the counter circuit 248 increases the value of XCount responsive to an access, the mitigation threshold calculation circuit 252 may set MT to a minimum value when the signal UsedSlot indicates that the aggressor queue 244 is empty (e.g., not storing any aggressor addresses) and increase the value of MT as the signal UsedSlots indicates that more slots have been used. In some embodiments, the MT may reach a maximum value before the aggressor queue 244 is full, and then remain at that maximum value. In some embodiments, the MT may continue to increase as the signal UsedSlots indicates that more slots have been used until the maximum value is reached for UsedSlots (e.g., all slots are full).

In some embodiments, the maximum value of the mitigation threshold may be expressed by equation 1, below:

$$MT_{MAX} \leq DHL - \text{GAP} - MD_{MAX} \quad \text{Eqn. 1}$$

where DHL represents a process limit of the device, GAP represents a buffer, and MDMAX represents a mitigation delay when the queue is full. The process limit DHL is a device specific value which represents a number of accesses at which loss of information is expected to occur based on the layout/architecture/etc. of the device. The buffer GAP is a value which may be used to add a cushion to help ensure the mitigation threshold is always below DHL. The maximum mitigation delay MDMAX represents a maximum expected amount of time it will take an address in the queue to have its victims refreshed when the queue is full.

The RHR state controller 242 may provide the signal RHR to indicate that a targeted refresh operation, such as a row hammer refresh (e.g., a refresh of the victim rows corresponding to an identified aggressor row) should occur. The RHR state controller 242 may also provide an internal refresh signal IREF, to indicate that an auto-refresh operation should occur. Responsive to an activation of RHR, the aggressor address register 244 may provide an aggressor address HitXADD, and the refresh address generator 250 may provide a refresh address RXADD, which may be one or more victim addresses associated with HitXADD. Responsive to IREF, the refresh address generator 250 may provide an auto-refresh address as the refresh address RXADD. The row decoder 208 may perform a refresh operation responsive to the refresh address RXADD and the row hammer refresh signal RHR. The row decoder 208 may perform a sequential refresh operation based on the refresh address RXADD and the internal refresh signal IREF.

The DRAM interface 240 may represent one or more components which provides signals to components of the bank. In some embodiments, the DRAM interface 240 may represent a memory controller coupled to the semiconductor memory device (e.g., device 100 of FIG. 1). In some embodiments, the DRAM interface 240 may represent components such as the command address input circuit 102, the address decoder 104, and/or the command decoder 106 of FIG. 1. The DRAM interface 240 may provide a row address XADD, the auto-refresh signal AREF, an activation signal ACT, and a precharge signal Pre. The auto-refresh signal AREF may be a periodic signal which may indicate when an auto-refresh operation is to occur. The activation signal ACT may be provided to activate a given bank of the memory. The precharge signal Pre may be provided to precharge the given bank of the memory. The row address XADD may be a signal which specifies one or more particular wordlines of the memory array 218, and may be a signal including multiple bits (which may be transmitted in series or in parallel).

In some embodiments, the counter 248 and the threshold comparator 246 may be physically close to the memory array 218, such that the counter bus XCount is relatively short compared to other buses into and out of the memory array 218. When either the comparator 246 or the counter 248 determines that value of XCount exceeds the threshold, the signal Agg may be sent to the aggressor address register 244 (and/or other components of the address refresh control circuit 216). In some embodiments, the counter 248 and the comparator 246 may be closer to the memory array 218 than the other components of the refresh address control circuit 216 (e.g., the RHR state control 242, the aggressor address register 244, and/or the refresh address generator 250). In some embodiments, the counter 248 and the threshold comparator 246 may be circuits which are local to the memory array 218, while the other components of the refresh address control circuit 216 may be bank level circuits. In some embodiments, only the signal Agg needs to run to the bank level circuits, which may reduce an area and power required for the XCount bus.

The RHR state controller 242 may receive the auto-refresh signal AREF and provide the row hammer refresh signal RHR. The auto-refresh signal AREF may be periodically generated and may be used to control the timing of refresh operations. The memory device may carry out a sequence of auto-refresh operations in order to periodically refresh the rows of the memory device. The RHR signal may be generated in order to indicate that the device should refresh a particular targeted row (e.g., a victim row) instead of an address from the sequence of auto-refresh addresses. The RHR state controller 242 may use internal logic to provide the RHR signal. In some embodiments, the RHR state controller 242 may provide the RHR signal based on certain number of activations of AREF (e.g., every 4th activation of AREF). The RHR state controller 242 may also provide an internal refresh signal IREF, which may indicate that an auto-refresh operation should take place. In some embodiments, the signals RHR and IREF may be generated such that they are not active at the same time (e.g., are not both at a high logic level at the same time).

The refresh address generator 250 may receive the row hammer refresh signal RHR and the match address HitXADD. The match address HitXADD may represent an aggressor row. The refresh address generator 250 may determine the locations of one or more victim rows based on the match address HitXADD and provide them as the refresh address RXADD. In some embodiments, the victim rows may include rows which are physically adjacent to the aggressor row (e.g., HitXADD+1 and HitXADD−1). In some embodiments, the victim rows may also include rows which are physically adjacent to the physically adjacent rows of the aggressor row (e.g., HitXADD+2 and HitXADD−2). Other relationships between victim rows and the identified aggressor rows may be used in other examples.

The refresh address generator 250 may determine the value of the refresh address RXADD based on the row hammer refresh signal RHR and the internal auto-refresh signal IREF. In some embodiments, when the signal IREF is active, the refresh address generator 250 may provide one of a sequence of auto refresh addresses. When the signal RHR is active, the refresh address generator 250 may provide a targeted refresh address, such as a victim address, as the refresh address RXADD.

The row decoder 208 may perform one or more operations on the memory array 218 based on the received signals and addresses. For example, responsive to the activation signal ACT and the row address XADD (and IREF and RHR being at a low logic level), the row decoder 208 may direct one or more access operations (for example, a read operation) on the specified row address XADD. Responsive to the RHR signal being active, the row decoder 208 may refresh the refresh address RXADD.

Figure 3:
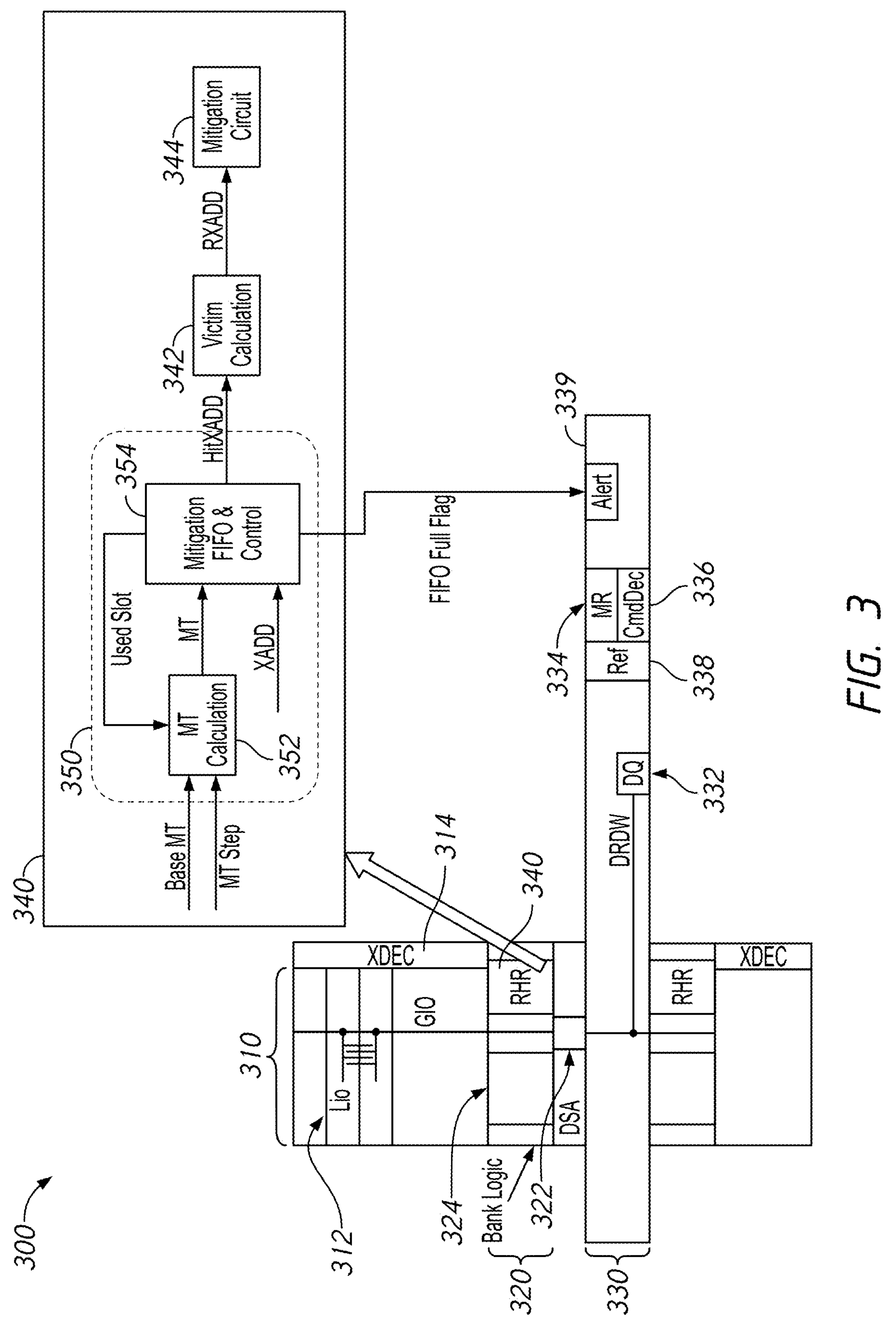
FIG. 3 is a block diagram of a layout of a portion of a memory device according to some embodiments of the present disclosure.

FIG. 3 is a block diagram of a layout of a portion of a memory device according to some embodiments of the present disclosure. The memory device 300 may represent a layout of a portion of a memory device, such as the array 118 of FIG. 1. The memory device 300 shows an inset box of targeted refresh circuits 340, which shows details of a portion of a refresh control circuit, which may implement portions of a refresh control circuit such as 116 of FIG. 1 and/or 216 of FIG. 2. The view of FIG. 3 shows an example layout and implementation which represents where certain circuits relevant to targeted refresh operations may be located within a memory device.

The memory device 300 shows a memory bank 310, which includes a memory array 312, where bit lines (shown as vertical lines) are coupled through LIO lines to GIO lines and from there to a bank logic region 320 associated with that bank and a central region 330. While only a single bank is discussed in regards to FIG. 3, the memory device 300 may include multiple memory banks such as 310, each of which may include a similar layout and bank logic region 320. The central region 330 may be coupled to the multiple banks and may include circuits which are used in common by multiple banks. The bank logic region 320 includes targeted refresh circuits 340 which may be used to perform targeted refresh operations on the bank 310, while the central region includes other refresh circuits 338. The targeted refresh circuits include an aggressor detector circuit 350 (e.g., 217 of FIG. 2) which acts to detect aggressors based on the count value and the mitigation threshold MT.

The central logic region 330 may be located in a center region of a chip which houses the memory device 300. The central logic region 330 may be elongated in a first direction (shown as horizontal in the layout of FIG. 3). The banks, such as 310, may be arranged in two rows of side by side banks, each arranged along either side of the central logic region 330. Each bank may be located in a second direction from the elongated axis of the central logic region 330, where the second direction is perpendicular to the first direction.

The bank 310 includes a row decoder 314 (e.g., 108 of FIG. 1 and/or 208 of FIG. 2) which activates word lines (here shown as horizontal, or elongated in the first direction). An example word line is shown, as well as several example bit lines in a section 312 of the bank 310. The bit lines are coupled through an LIO to a GIO, which is coupled though the bank logic region 320 to data terminals 332 in the central region 330. The bank logic region 320 may be located between the central logic region 330 and the bank 310.

The bank logic region 320 includes a command logic circuit 324, the targeted refresh circuits 340 and a counter circuit 322 (e.g., 248 of FIG. 2). The central region 330 includes a data or DQ terminal 332 which sends and receives data to/from a controller. The central region 330 also includes a command decoder 336 (e.g., 110 of FIG. 1) a refresh control circuit 338 and a mode register 334 which stores settings of the memory. The central region 330 also includes alert logic 339 which may be used to send alert signals to the controller.

The refresh control circuit 338 and the targeted refresh circuits 340 may together implement a refresh control circuit such as 116 of FIG. 1 and/or 216 of FIG. 2. As described in more detail herein, the targeted refresh circuits 340 may include components such as a threshold calculation circuit 352 (e.g., 252 of FIG. 2), an aggressor register and control circuit 354 (e.g., 244 and 246 of FIG. 2), as well as a victim calculation circuit 342 (e.g., which may implement part of the refresh address generator 250) and a mitigation circuit 344. The mitigation calculation circuit 352, aggressor queue 354 and counter 322 may be part of an aggressor detector circuit 350. Unlike in the embodiment of FIG. 2, where certain components were shared between the sequential refresh operations and the targeted refresh operations, such as the refresh address generator circuit, in the embodiment of FIG. 3 these functions are split apart, with the targeted refresh circuits 340 implementing the targeted refresh operations and the refresh control circuit 338 implementing the sequential refresh operations and the timing and type of refresh operations.

During an access operation, the command decoder 336 receives an access command (e.g., a read or write command). Based on the received row and column address, the row decoder 314 activates a word line and the column decoder (not shown) couples the selected bit lines to the GIO. Counter memory cells along the word line are read out along their respective GIO lines to the counter circuit 322 which updates the count and provides it to the targeted refresh circuits 340.

The targeted refresh circuits 340 includes aggressor queue circuits 350, which include a threshold calculation circuit 352 and the aggressor queue 354 (which also includes related control circuits). In the embodiment of FIG. 3, the aggressor queue 354 may be a FIFO register. The threshold calculation circuit 352 sets a value of the mitigation threshold. When an address XADD is detected to be an aggressor HitXADD based on its count crossing MT, it is added to the queue 354 and the queue 354 updates a signal UsedSlot. The MT calculation circuit 352 updates the value of MT based on the value of UsedSlot. When targeted refresh operations are called for, the queue 354 provides a stored aggressor HitXADD (and updates the value of UsedSlot) to a victim calculation circuit 342, which generates refresh address(es) RXADD. The mitigation circuit 344 includes various timing and command circuits which instruct the row decoder 314 to refresh the word lines associated with RXADD.

In the embodiment of FIG. 3, the mitigation threshold calculation circuit 352 uses settings stored in the mode register 334 to determine the current value of the mitigation threshold. The mode register 334 stores setting of Base MT and MT Step. The Base MT setting sets a minimum value of the MT. The MT step sets a step size and for each increasing value of UsedSlot, the MT is set by equation 2, below:

$$MT = \text{Base}\, MT + MT\ \text{Step} * \text{UsedSlot} \qquad \text{Eqn. 2}$$

The values of MT Step and Base MT may be settings which may be adjusted by a customer or other user of the memory to control the behavior of the MT calculation circuit 352. In some embodiments, the MT calculation may be disabled, for example by setting Base MT to a desired value and MT step to 0. Other methods of determining MT may be used in other example embodiments.

If the aggressor queue 354 becomes full, it provides an full signal or full flag to the alert logic 339 in the central region 330. Responsive to the full signal, the alert logic provides an alert signal to the controller. For example by providing the alert signal at an active level along an alert pin/alert bus. Responsive to the alert signal, the controller may provide a refresh management command, which causes targeted refresh operations to be performed.

Figure 4:
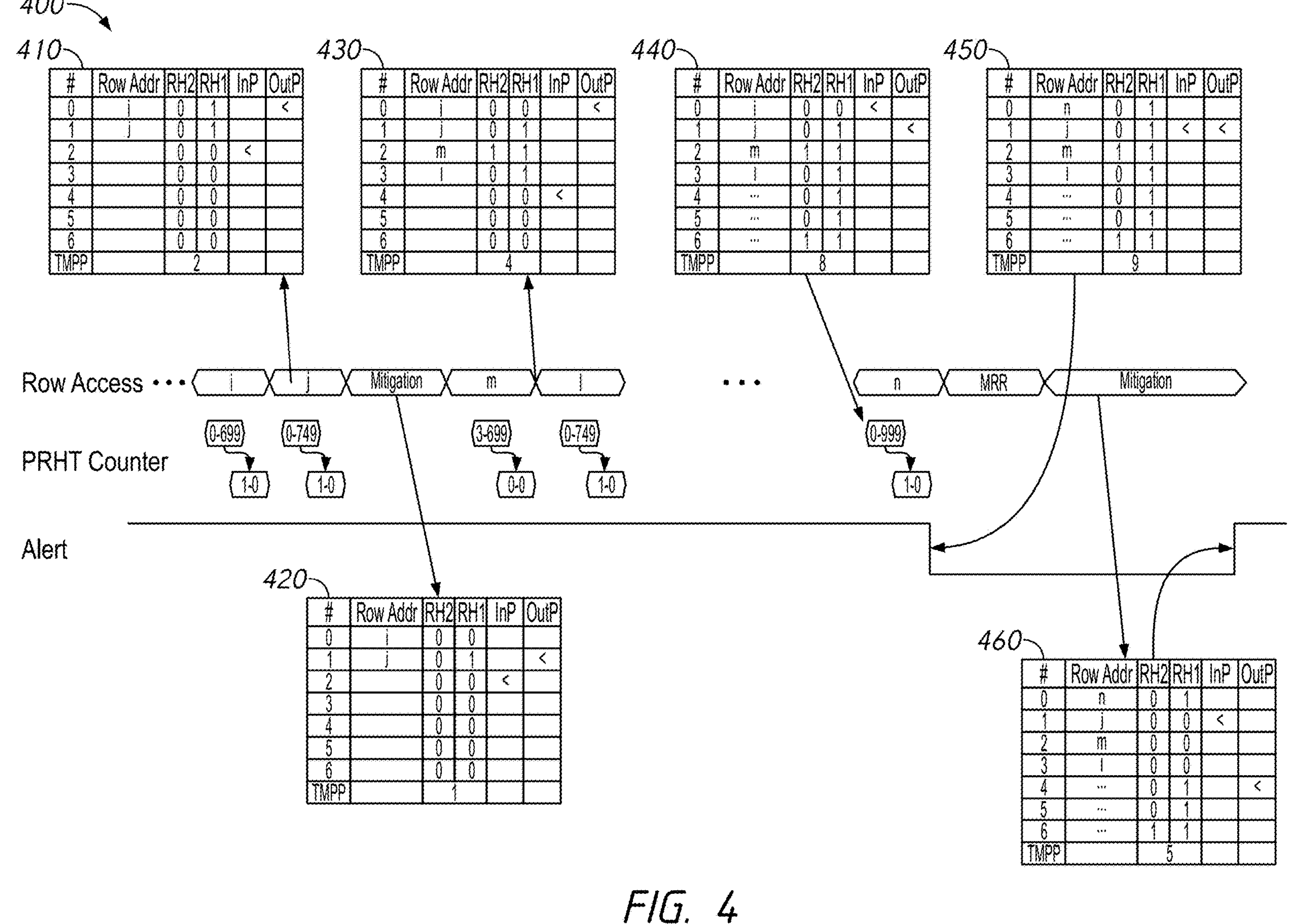
FIG. 4 is a timing diagram of access operations with an adjustable mitigation threshold according to some embodiments of the present disclosure.

FIG. 4 is a timing diagram of access operations with an adjustable mitigation threshold according to some embodiments of the present disclosure. FIG. 4 shows a timing diagram 400 which may, in some embodiments, represent operations in a memory such as 100 of FIG. 1, 200 of FIG. 2, and/or 300 of FIG. 3.

The timing diagram 400 shows a set of tables 410-460, each of which represents a state of the aggressor queue or aggressor register (e.g., 244 of FIG. 2 and/or 354 of FIG. 3). The timing diagram shows a set of row accesses, along a command/address bus, which show access commands to different row addresses (here labelled i, j, m, l, and n) as well as a state of the row counter or PRHT counter XCount associated with that row address. Commands are also received along the command/address bus. An alert signal/alert bus is also shown.

The timing diagram 400 shows a situation which is set up to illustrate how the mitigation threshold MT changes. In this illustrative example, each row is accessed repeatedly until the mitigation threshold is exceeded and that row address is added to the queue. The commands mitigation show when targeted refresh operations are performed.

The example aggressor queues 410-460 include a number of slots (each shown as a row of a table) each of which stores an identified aggressor address, two aggressor flags, and input and output pointers InP and OutP. When an address is first added to the queue, its address is added to the queue and a first aggressor flag RHR1 is set. If the same address is identified again, then a second aggressor flag RHR2 may be set. Addresses with both aggressor flags set may be refreshed with only one aggressor flag set. Once a targeted refresh operation (or mitigation) is performed on the victims of a stored address, both its flags are reset to an unset state. This makes the row count as empty (although the address may not be removed until it is overwritten with a new address).

The table 410 shows the aggressor queue in a first state, where a row address j has just been identified as an aggressor. Previous to the state of the table 410, a row address i was accessed 700 times, which is the base MT in this example, and the address i was added to an empty queue, and that slots flag RHR1 was set. The table 410 shows a state after a second row, j, was accessed 750 times. Since the queue contained 1 address, the threshold had increased to 750, so after 750 accesses, the address j is also added to the queue, and its RHR1 flag is set.

The table 420 shows a state of the queue after a mitigation is performed (e.g., due to an RFM command or internal logic during auto- or self-refresh operations). Since the address i was added first, its victim rows are refreshed and the flag RHR1 is unset. Since there is now only 1 address in the queue, the MT returns to a value of 750. By the time of the table 430, the queue contains 3 addresses, one of which, row m, has had both flags set.

Jumping forward in time, at a time represented by the table 440, all but one row of the queue is full. The mitigation threshold has risen to a value of 1000. When a row n is accessed 1000 times, the address is added to the queue, as represented by the table 450, however at this point the queue is full. Responsive to this, the alert signal is activated. In this embodiment, the alert signal may be active low, so its logical state may change from a logical high to a logical low. A controller may issue a mode register read MRR operation responsive to the alert signal becoming active to determine what kind of issue caused the alert signal to be active. Responsive to that mitigation is performed, in this case responsive to a refresh management command from the controller. As shown in the table 460, that causes three of the rows to have their victims refreshed, which in turn means the queue is not empty anymore. The alert signal returns to an inactive level.

Figure 5:
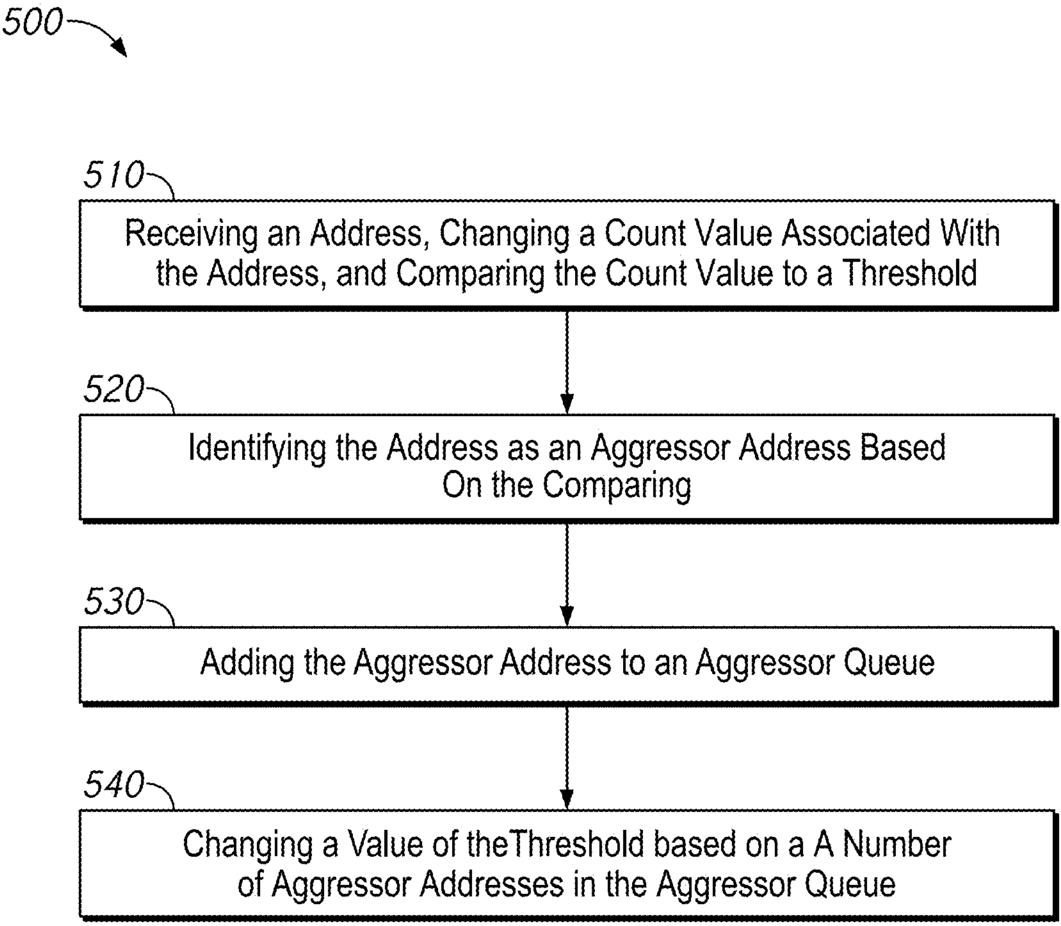
FIG. 5 is a flow chart of a method of setting a mitigation threshold according to some embodiments of the present disclosure.

FIG. 5 is a flow chart of a method of setting a mitigation threshold according to some embodiments of the present disclosure. The method 500 may, in some embodiments, be implemented by one or more of the systems or apparatuses described herein. For example, the method may be performed by the memory devices (or portions thereof) 100, 200, and/or 300 of FIGS. 1-3.

The method 500 begins with block 510, which describes receiving an address, changing a count value associated with the address and comparing the count value to a threshold. The address may be received as part of an access operation on memory cells along a word line associated with the address. For example, the method 500 may include receiving the address along a CA bus from a controller. The method 500 may include reading the count value from counter memory cells (e.g., 126 of FIG. 1 and/or 226 of FIG. 2) along the word line associated with the address, modifying the count value with a counter circuit (e.g., 248 of FIG. 2 and/or 322 of FIG. 3) and writing the modified count value back to the counter memory cells. In some embodiments, the changing may include changing the count value in a first direction, for example by incrementing the count value.

Box 510 may be followed by box 520, which describes identifying the address as an aggressor address based on the comparing. For example, the method 500 may include identifying the address as an aggressor if the count value crosses the threshold. The method 500 may include changing the count value in a second direction opposite the first direction responsive to determining that the address is an aggressor address. For example, if the first direction increases the count value (e.g., by incrementing for each access) then the second direction may include decreasing the count value (e.g., by subtracting a value such as the threshold value or resetting the count value to an initial value responsive to determining the address is an aggressor).

Box 520 may be followed by box 530 which describes adding the aggressor address to an aggressor queue (e.g., 244 of FIG. 2 and/or 354 of FIG. 3). The method 500 may include determining if there is an open slot in the aggressor queue and storing the aggressor address identified in box 520 to the open slot.

Box 530 may be followed by box 540, which describes changing a value of the threshold based on a number of aggressor addresses in the queue. For example the method 500 may include changing the threshold in the first direction (e.g., increasing) responsive to adding an address to the queue and changing the threshold in the second direction (e.g., decreasing) responsive to removing an address from the queue. In some embodiments, the method 500 may include setting a value of the threshold based on a base threshold value (e.g., Base MT) plus a multiple of a number of addresses in the queue and a threshold step size (e.g., MT Step*UsedSlot). The base threshold value and threshold step size may be settings of a mode register.

The method 500 may include performing a targeted refresh operation on one or more addresses based on a selected one of the aggressor addresses in the aggressor queue and removing the selected one of the aggressor addresses from the aggressor queue. In some embodiments, the method 500 may include providing a queue full signal when the aggressor queue becomes full (e.g., when a last slot is filled) and activating an alert signal responsive to the queue full signal.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:

an aggressor queue configured to store identified aggressor addresses;

a counter circuit configured to receive a row address and change a count value associated with the row address;

a threshold comparator circuit configured to compare the changed count value to a mitigation threshold and store the row address as an identified aggressor address in the aggressor queue; and a mitigation threshold circuit configured to set a value of the mitigation threshold based on a number of the identified aggressor addresses stored in the aggressor queue.

2. The apparatus of claim 1, further comprising a memory array comprising a word line associated with a row address, wherein the count value is stored in memory cells along the word line.

3. The apparatus of claim 1, wherein the mitigation threshold circuit is configured to increase the mitigation threshold as the number of addresses in the aggressor queue increases.

4. The apparatus of claim 1, wherein the counter circuit is configured to increase the count value when the row address is received as part of an access operation.

5. The apparatus of claim 1, further comprising a refresh address generator configured to generate at least one refresh address based on a selected one of the identified aggressor addresses in the aggressor queue as part of a targeted refresh operation, wherein the selected one of the identified aggressor addresses is removed from the aggressor queue responsive to the targeted refresh operation.

6. The apparatus of claim 1, further comprising an alert logic circuit configured to issue an alert signal along an alert bus when the aggressor queue is full.

7. The apparatus of claim 1, further comprising a mode register configured to store a base threshold value and a threshold step value, wherein the mitigation threshold circuit is configured to set a value of the mitigation threshold based on the base threshold value plus the multiple of the threshold step value and a number of the identified aggressor addresses stored in the aggressor queue.

8. An apparatus comprising:

a memory array comprising a plurality of word lines each associated with a row address and a count value;

an aggressor queue comprising a plurality of slots, wherein the aggressor queue is configured to provide a used slot signal which indicates a number of the plurality of slots which store an address;

an aggressor detection circuit configured to set a value of a mitigation threshold based on the used slot signal, and configured to determine if a row address is an aggressor address based on a comparison of the count value to the mitigation threshold when the row address is accessed and configured to store the aggressor row address in one of the plurality of slots.

9. The apparatus of claim 8, wherein the memory array comprises a plurality of counter memory cells along each of the plurality of word lines, wherein the plurality of counter memory cells are configured to store the count value associated with the word line.

10. The apparatus of claim 8, further comprising a refresh address generator configured to generate a refresh address based on a selected one of the stored addresses in the aggressor queue as part of a targeted refresh operation, wherein the selected one of the stored addresses is removed from the aggressor queue responsive to the targeted refresh operation.

11. The apparatus of claim 8, further comprising an aggressor detection circuit configured to change the count value in a first direction when the row is accessed and configured to reset the count value when the address is added to the queue.

12. The apparatus of claim 8, wherein the aggressor queue is configured to issue an queue full signal responsive to all of the plurality of slots being filled, the apparatus further comprising an alert logic circuit configured to issue an alert signal responsive to the queue full signal.

13. The apparatus of claim 8, wherein the aggressor detection circuit is configured to increase the mitigation threshold as the used slot signal indicates a higher number of the plurality of slots are filled and configured to decrease the mitigation threshold as the used slot signal indicates a lower number of the plurality of slots are filled.

14. A method comprising:

receiving an address, changing a count value associated with the address and comparing the count value to a threshold;

identifying the address as an aggressor address based on the comparing;

adding the aggressor address to an aggressor queue; and changing a value of the threshold based on a number of aggressor addresses in the queue.

15. The method of claim 14, further comprising:

changing the value of the threshold in first direction responsive to increasing the number of aggressor addresses in the queue; and changing the value of the threshold in a second direction opposite the first direction responsive to decreasing the number of aggressor addresses in the queue.

16. The method of claim 14, further comprising changing the value of the threshold by adding a base threshold size to a multiple of a threshold step size by the number of the aggressor addresses in the queue.

17. The method of claim 14, further comprising performing a targeted refresh operation on the aggressor address and removing the aggressor address from the aggressor queue responsive to the targeted refresh operation.

18. The method of claim 14, further comprising receiving the address as part of performing an access operation on a word line associated with the address.

19. The method of claim 18, wherein changing the count value includes reading the count value from memory cells along the word line, changing the count value, and writing the changed count value back to the memory cells.

20. The method of claim 14, further comprising activating an alert signal when the aggressor queue becomes full.

* * * * *